US009978353B2

(12) United States Patent
Seto et al.

(10) Patent No.: US 9,978,353 B2
(45) Date of Patent: May 22, 2018

(54) TRANSPORTATION VEHICLE PART AND PANEL MEMBER THEREFOR

(71) Applicant: NIPPON STEEL & SUMITOMO METAL CORPORATION, Tokyo (JP)

(72) Inventors: Atsushi Seto, Tokyo (JP); Koichi Hamada, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 0 days. days.

(21) Appl. No.: 15/113,681

(22) PCT Filed: Feb. 2, 2015

(86) PCT No.: PCT/JP2015/052872
§ 371 (c)(1),
(2) Date: Jul. 22, 2016

(87) PCT Pub. No.: WO2015/115647
PCT Pub. Date: Aug. 6, 2015

(65) Prior Publication Data
US 2017/0011730 A1    Jan. 12, 2017

(30) Foreign Application Priority Data
Feb. 3, 2014  (JP) .................................. 2014-018297

(51) Int. Cl.
*F16F 15/02*  (2006.01)
*G10K 11/168*  (2006.01)
(Continued)

(52) U.S. Cl.
CPC ........ *G10K 11/168* (2013.01); *B60R 13/0838* (2013.01); *F16F 15/02* (2013.01); *F16F 15/08* (2013.01); *F16F 2224/02* (2013.01)

(58) Field of Classification Search
CPC ...... G10K 11/168; B62D 25/02; B62D 25/14; B62D 25/20; B62D 25/2045;
(Continued)

(56) References Cited

U.S. PATENT DOCUMENTS 3,876,034 A * 4/1975 Antonini .................. E04B 1/86
                                                  181/208
4,223,073 A * 9/1980 Caldwell ................ B32B 15/06
                                                  165/69

(Continued)

FOREIGN PATENT DOCUMENTS

CN   101068705 A   11/2007
CN   101240553 A   8/2008
(Continued)

OTHER PUBLICATIONS

Office Action dated May 8, 2017, in Chinese Patent Application No. 201580006085.7, with English translation.
(Continued)

Primary Examiner — Edgardo San Martin
(74) Attorney, Agent, or Firm — Birch, Stewart, Kolasch & Birch, LLP

(57) ABSTRACT

A transportation vehicle part that includes: a patch member constructed of a plate-like metal patch panel, and a vibration attenuating resin layer provided along a surface of the patch panel; and a metal base plate closely adhered with the vibration attenuating resin layer of the patch member and affixed with the patch member; according to this configuration, the transportation vehicle part which has a superior vibration characteristic without greatly increasing the thickness and the weight of the transportation vehicle part is provided.

9 Claims, 17 Drawing Sheets

(51) Int. Cl.
   *B62D 25/02* (2006.01)
   *B60R 13/08* (2006.01)
   *F16F 15/08* (2006.01)
   *F16F 15/00* (2006.01)
   *G10K 11/16* (2006.01)

(58) Field of Classification Search
   CPC ............ B62D 25/2054; B60R 13/0838; B60R 13/083; F16F 15/02; F16F 15/04; F16F 15/08; F16F 9/306
   USPC .......................... 181/207, 208, 209, 205, 204
   See application file for complete search history.

(56) References Cited

U.S. PATENT DOCUMENTS

| | | | | |
|---|---|---|---|---|
| 4,516,658 A * | 5/1985 | Scarton | ...................... | F16F 7/08 173/210 |
| 4,906,501 A * | 3/1990 | Honma | ..................... | B32B 5/18 156/79 |
| 5,143,755 A * | 9/1992 | Moore, III | ............... | F02F 7/006 427/373 |
| 5,300,355 A * | 4/1994 | Mifune | .................... | B32B 27/06 248/206.5 |
| 6,482,496 B1 * | 11/2002 | Wycech | .................. | B29C 44/12 296/146.6 |
| 6,536,555 B1 * | 3/2003 | Kelsic | ..................... | F16F 9/306 181/207 |
| 7,040,691 B1 * | 5/2006 | Jacobs | ................. | B62D 29/001 296/193.07 |
| 7,784,165 B2 * | 8/2010 | Xiao | ......................... | B32B 1/00 181/290 |
| 7,837,147 B2 * | 11/2010 | Liguore | ................ | B29C 70/088 181/208 |
| 8,479,876 B2 * | 7/2013 | Fetsko | .................... | B60R 13/08 181/207 |
| 8,939,498 B2 * | 1/2015 | Fisk | ........................ | B60R 13/08 296/193.07 |
| 8,997,920 B2 * | 4/2015 | Fuhrmann | ............ | G10K 11/002 181/207 |
| 9,168,880 B2 * | 10/2015 | Adams | .................... | B60R 13/08 |
| 2005/0019590 A1 * | 1/2005 | Josefsson | ................ | B32B 15/06 428/457 |
| 2005/0126848 A1 * | 6/2005 | Siavoshai | ........... | B60R 13/0815 181/207 |
| 2010/0196736 A1 * | 8/2010 | Boger | ..................... | B32B 15/08 428/621 |
| 2017/0069304 A1 * | 3/2017 | Seto | ........................ | F16F 15/02 |

FOREIGN PATENT DOCUMENTS

| | | | | |
|---|---|---|---|---|
| CN | 102947134 | A | 2/2013 | |
| CN | 103080597 | A | 5/2013 | |
| CN | 203098727 | U | 7/2013 | |
| CN | 103547485 | A | 1/2014 | |
| EP | 1018725 | A2 * | 7/2000 | .......... G10K 11/168 |
| JP | 55-89735 | U | 6/1980 | |
| JP | 59-160224 | U | 10/1984 | |
| JP | 61127937 | A * | 6/1986 | ............. F16F 15/04 |
| JP | 62-64844 | A | 3/1987 | |
| JP | 5-42629 | A | 2/1993 | |
| JP | 6-301388 | A | 10/1994 | |
| JP | 8-224827 | A | 9/1996 | |
| JP | 10-324186 | A | 12/1998 | |
| JP | 2000-336606 | A | 12/2000 | |
| JP | 2013-508219 | A | 3/2013 | |
| JP | 2013-535030 | A | 9/2013 | |
| KR | 10-2013-0103706 | A | 9/2013 | |
| WO | WO 2011/159567 | A2 | 12/2011 | |
| WO | WO 2012/129386 | A2 | 9/2012 | |

OTHER PUBLICATIONS

International Search Report for PCT/JP2015/052872 dated Apr. 28, 2015.
Written Opinion of the International Searching Authority for PCT/JP2015/052872 (PCT/ISA/237) dated Apr. 28, 2015.
Korean Office Action for corresponding Korean Application No. 10-2016-7019952, dated Dec. 5, 2017, including a partial English translation.
Chinese Office Action for corresponding Chinese Application No. 201580006085.7, dated Jan. 29, 2018, with English translation.

* cited by examiner

TRANSPORTATION VEHICLE PART AND PANEL MEMBER THEREFOR

TECHNICAL FIELD

The present invention relates to a transportation vehicle part for attenuating noise and vibration and a panel member therefor.

BACKGROUND ART

In transportation vehicles such as automobiles, railroad vehicles, vessels, and aircrafts, noise and vibration are generated due to various kinds of factors.

For example, an engine or a motor that is an automobile power source generates noise and vibration while the engine or the motor is being driven. In addition, while an automobile travels, noise and vibration are generated in the vehicle body by an uneven road surface or the like. If such noise and vibration are directly transmitted into the vehicle body (cabin), occupants in the vehicle may be uncomfortable.

In view of this, techniques for suppressing such noise and vibration have been developed heretofore. For example, Patent Literature 1 discloses an asphalt sheet. The asphalt sheet of Patent Literature 1 may be used by being affixed on a floor panel of a vehicle as a measure against vibration and noise in the vehicle.

In other cases, for example, Patent Literature 2 and Patent Literature 3 respectively disclose a sound attenuating patch. The sound attenuating patch of each of Patent Literature 2 and Patent Literature 3 may be affixed on a main panel via an adhesive layer and attenuates noise and vibration.

CITATION LIST

Patent Literature

Patent Literature 1: JP H10-324186A
Patent Literature 2: JP 2013-535030T
Patent Literature 3: JP 2013-508219T

SUMMARY OF INVENTION

Technical Problem

In a case of using an asphalt sheet as disclosed in Patent Literature 1, the effect for suppressing noise and vibration can be recognized. However, the thickness of the asphalt sheet itself is 3 to 6 mm and is great. Therefore, for example, when the asphalt sheet is affixed on a dash panel, a floor panel, and the like in an automobile, the interior space of the automobile is undesirably decreased. In addition, since the asphalt sheet has a relatively large weight, when the asphalt sheet is affixed, the weight of the automobile is undesirably greatly increased.

On the other hand, in each of Patent Literature 2 and Patent Literature 3, a sheet-like metal member is used as the sound attenuating patch. However, according to a result of an intensive research that was conducted by the inventors of the present invention, there may be cases in which noise and vibration are not sufficiently suppressed by merely affixing the sheet-like member on a dash panel and the like in an automobile. Specifically, for example, the rigidity of the dash panel cannot be sufficiently improved by merely affixing the sheet-like member on the dash panel. In addition, the sheet-like member does not have a vibration attenuating function. Therefore, the vibration characteristic of the dash panel is not improved, and there may be cases in which noise and vibration cannot be sufficiently suppressed with regard to the dash panel.

The present invention has been achieved in order to solve such problems, and an object of the present invention is to provide a transportation vehicle part which has a superior vibration characteristic without greatly increasing the thickness and the weight of the transportation vehicle part and is to provide a panel member for improving the vibration characteristic of the transportation vehicle part without greatly increasing the thickness and the weight of the transportation vehicle part.

Solution to Problem

The inventors of the present invention conducted an intensive research in order to improve a vibration characteristic of a transportation vehicle part while the thickness of the transportation vehicle part is not greatly increased.

As a result, it was found that the structure of a panel member, which is a material of a transportation vehicle part, is important. That is, by constructing a panel member of a metal base plate and a patch member which is formed of a vibration attenuating resin layer and a patch panel, and by affixing the patch member on the base plate while the vibration attenuating resin layer of the patch member is closely contacted with the base plate, vibration can be attenuated by heat that is generated by deformation of the vibration attenuating resin layer.

Moreover, it was found that it is important to perform spot welding on the base plate and the patch member beforehand. More specifically, in a transportation vehicle part which is produced by deforming a panel member, by improving the rigidity of the portion which is deformed (hereinafter called a worked portion), the vibration characteristic of the transportation vehicle part is improved. In addition, by performing the spot welding on a main body and the patch member beforehand at a portion of the panel member to be deformed (hereinafter called a working scheduled portion), the rigidity of the worked portion of the transportation vehicle part is sufficiently improved. Accordingly, by performing the spot welding on the main body and the patch member beforehand at the working scheduled portion, the rigidity of the worked portion is sufficiently improved by using the patch member having a small thickness, whereby the vibration characteristic of the transportation vehicle part is improved.

The present invention has been completed based on the above findings, and the present invention provides a transportation vehicle part and a panel member as described below.

(1)

A transportation vehicle part including:

a patch member constructed of a plate-like metal patch panel, and a vibration attenuating resin layer provided along a surface of the patch panel; and a metal base plate closely adhered with the vibration attenuating resin layer of the patch member and affixed with the patch member.

(2)

The transportation vehicle part according to (1), wherein the patch panel and the base plate are welded together at at least one part of the patch panel and the base plate.

(3)

The transportation vehicle part according to (1) or (2), wherein the transportation vehicle part includes a ridged portion, and the patch panel and the base plate are welded together at at least one part of the ridged portion.

(4)

The transportation vehicle part according to any one of (1) to (3), wherein the transportation vehicle part is provided with a rigidity reinforced portion which has an uneven shape.

(5)

The transportation vehicle part according to any one of (1) to (4), wherein the vibration attenuating resin layer is an electrically conductive.

(6)

The transportation vehicle part according to any one of (1) to (5), wherein the patch panel has a thickness of not less than 0.3 mm and not greater than a thickness of the base plate.

(7)

The transportation vehicle part according to any one of (1) to (6), wherein the vibration attenuating resin layer has a thickness of not less than 10 μm and not greater than 1000 μm.

(8)

The transportation vehicle part according to any one of (1) to (7), wherein the vibration attenuating resin layer is constructed of multiple layers which have different temperature characteristics with each other.

(9)

The transportation vehicle part according to (8), wherein a panel is inserted between the multiple layers.

(10)

The transportation vehicle part according to any one of (1) to (9), wherein an uneven surface processing is performed on a surface of the patch panel or a surface of the base plate, which contacts the vibration attenuating resin layer.

(11)

A panel member including:

a patch member constructed of a plate-like metal patch panel, and a vibration attenuating resin layer provided along a surface of the patch panel; and a metal base plate closely adhered with the vibration attenuating resin layer of the patch member and affixed with the patch member.

Advantageous Effects of Invention

According to the present invention, a transportation vehicle part which has a superior vibration characteristic is provided without greatly increasing the thickness and the weight of the transportation vehicle part, and a panel member for improving the vibration characteristic of the transportation vehicle part without greatly increasing the thickness and the weight of the transportation vehicle part is also provided.

DESCRIPTION OF EMBODIMENTS

Figure 1:
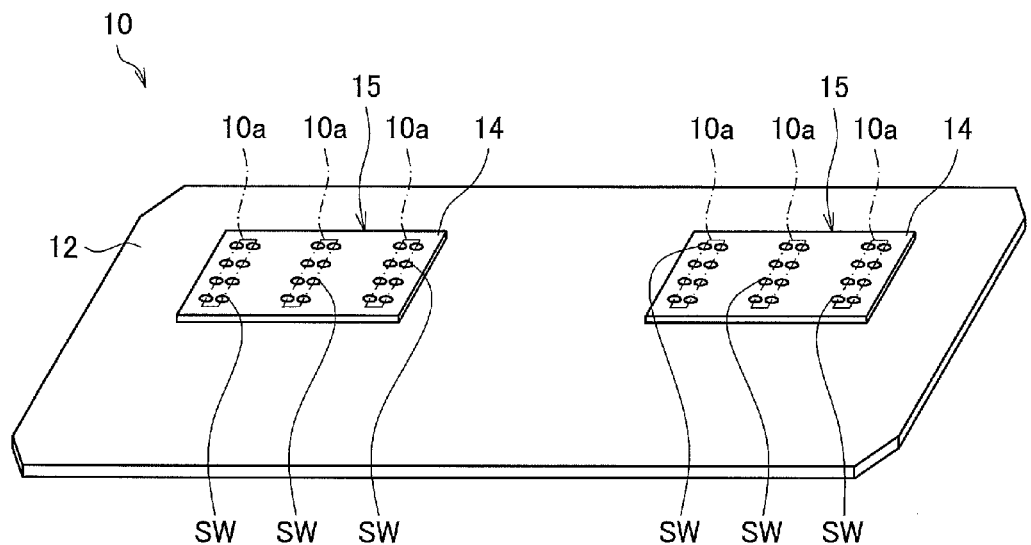
FIG. 1 is an external perspective view of a panel member according to an embodiment of the present invention.
Figure 2:
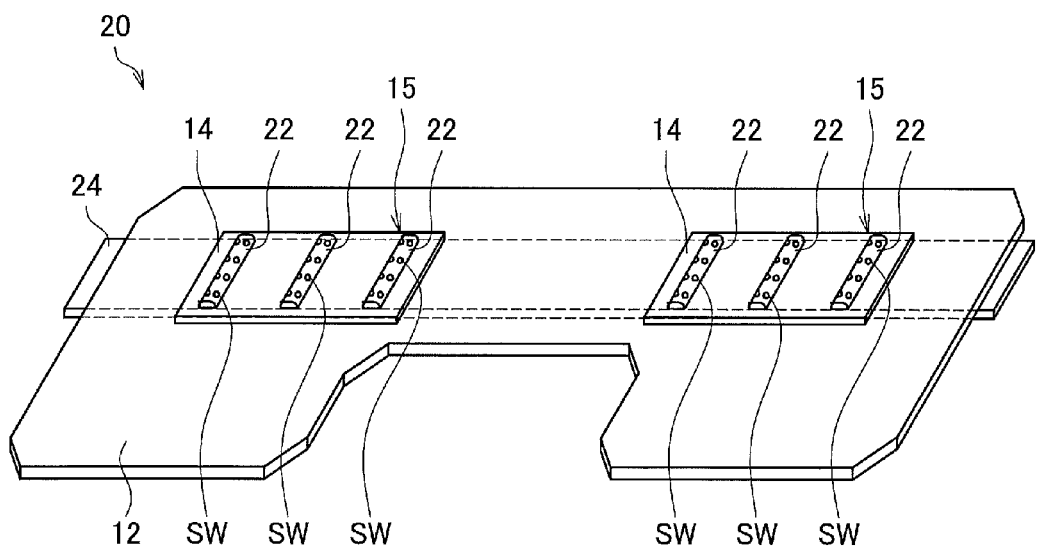
FIG. 2 is an external perspective view of a dash panel according to an embodiment of the present invention.

Hereinafter, details of a panel member of the present invention will be described. FIG. 1 is an external perspective view of a panel member 10 according to an embodiment of the present invention. FIG. 2 is an external perspective view showing a dash panel 20 which is produced by using the panel member 10.

As shown in FIG. 1, the panel member 10 includes a plate-like main body (base plate) 12 and a pair of patch members 15 which is affixed on the main body 12. In this embodiment, in a plan view, the patch members 15 are smaller in size than the main body 12. Each of the patch members 15 is formed of a patch panel 14 and a vibration attenuating resin layer 18 (refer to FIG. 4) which is provided along a surface of the patch panel 14, and the patch panel 14 is affixed on the main body 12 via the vibration attenuating resin layer 18. The panel member 10 has multiple working scheduled portions 10a which extend mutually in parallel. The working scheduled portions 10a are portions which are to be deformed when a transportation vehicle part (in this embodiment, a dash panel 20) is produced by using the panel member 10.

In this embodiment, for example, when the dash panel 20 is produced by using the panel member 10 in an automobile manufacturing plant, bead working (rigidity reinforcing working) is performed on the multiple working scheduled portions 10a, and multiple worked portions are formed. In this embodiment, as shown in FIG. 2, multiple bead portions 22 are formed as the worked portions. Each of the bead portions 22 is formed so as to extend in one direction. It should be noted that the bead working is exemplified as the rigidity reinforcing working in this embodiment, but another method such as emboss working may be performed.

The main body 12 and the patch panels 14 are made of metal materials (for example, steel plates). More specifically, for example, a thin steel plate may be used for the main body 12. The thickness of the main body 12 is, for example, 0.5 to 3.2 mm, and more preferably 0.7 to 2.3 mm. As for the patch panels 14, for example, a steel plate (such as a soft steel) which is made of the same metal material as the main body 12 may be used. Details will be described later, but since a vibration attenuating function is performed by the vibration attenuating resin layer 18, the patch panels 14 may be made of another metal material such as aluminum, a resin material, or the like. In order to increase the rigidity of the panel member 10, a metal material is suitably used for the patch panels 14. The thickness of the patch panels 14 is, for example, 0.5 to 2.0 mm, and more preferably 0.7 to 1.2 mm. The vibration attenuating resin layer 18 that is described later is made of a viscoelastic resin, and for example, an acrylic resin which also functions as an adhesive may be used.

As shown in FIG. 1, the patch panels 14 are spot-welded at the working scheduled portions 10a on the main body 12. In this embodiment, multiple portions of the patch panels 14 are bonded to the main body 12 by the spot welding. Thus, each of the working scheduled portions 10a is formed with multiple spot-welded portions SW. In order to spot welding the patch panels 14 to the main body 12, the vibration attenuating resin layer 18 has conductivity. It should be noted that the bonding of the main body 12 and the patch panels 14 may not necessarily be performed by the spot welding and may be performed by laser welding, arc welding, arc spot welding, or the like. In a case of bonding the main body 12 and the patch panels 14 by a method other than the spot welding, the vibration attenuating resin layer 18 may not necessarily have conductivity.

As shown in FIG. 2, the dash panel 20 that is produced by using the panel member 10 is provided with a cross member 24, for example. Specifically, the cross member 24 is fixed on a front surface (surface in the front side in an automobile longitudinal direction) of the dash panel 20. In this embodiment, the pair of the patch members 15 is provided at a position opposite to the position of the cross member 24 so as to hold the main body 12 between the patch members 15 and the cross member 24.

Figure 3A:
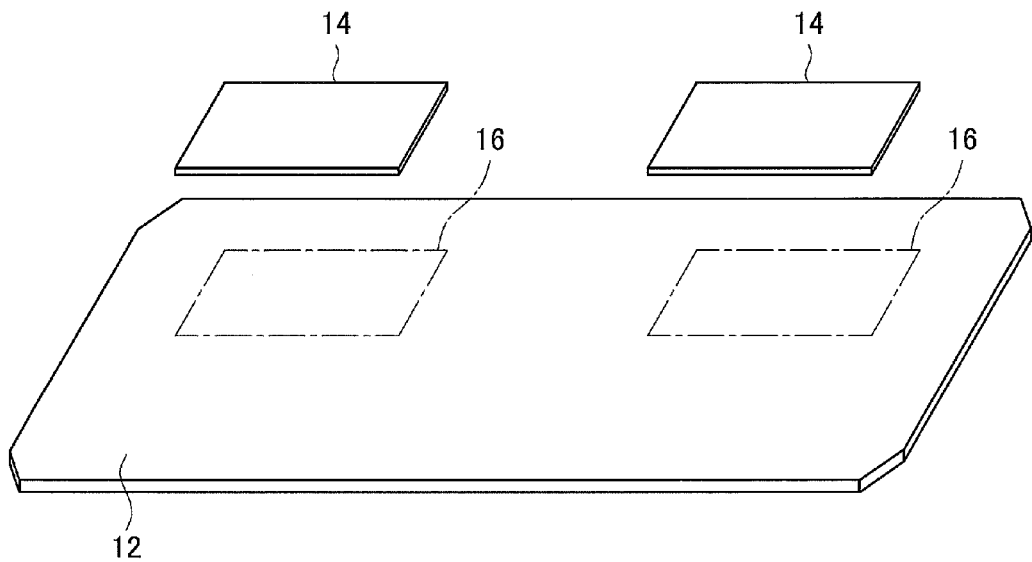
FIG. 3A illustrates an example of a method for producing a panel member.
Figure 3B:
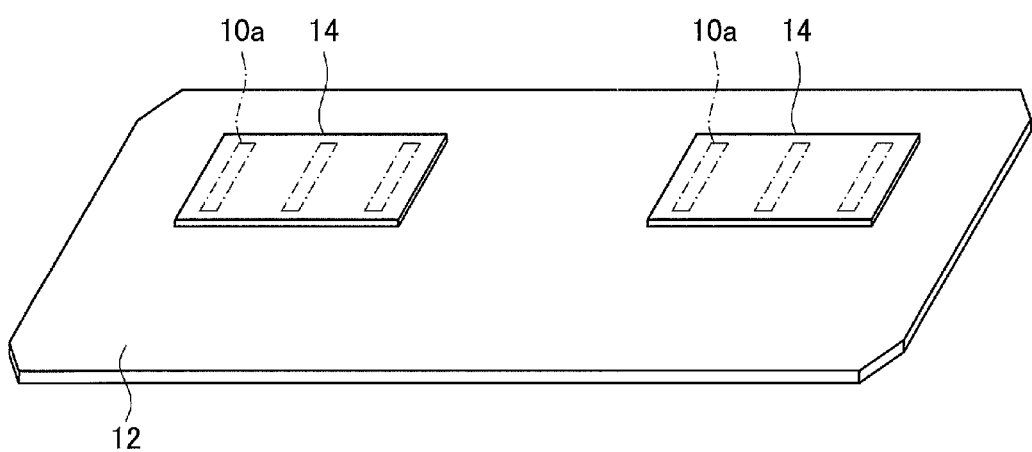
FIG. 3B illustrates an example of a method for producing a panel member.
Figure 4A:
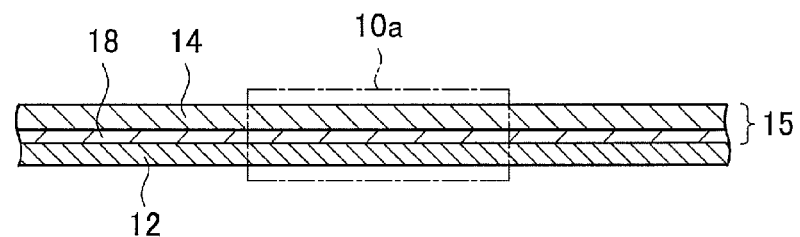
FIG. 4A illustrates an example of a method for producing a panel member and a dash panel.
Figure 4B:
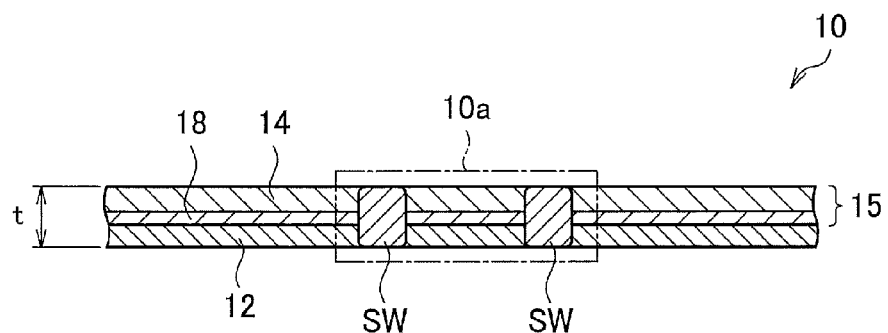
FIG. 4B illustrates an example of a method for producing a panel member and a dash panel.
Figure 4C:
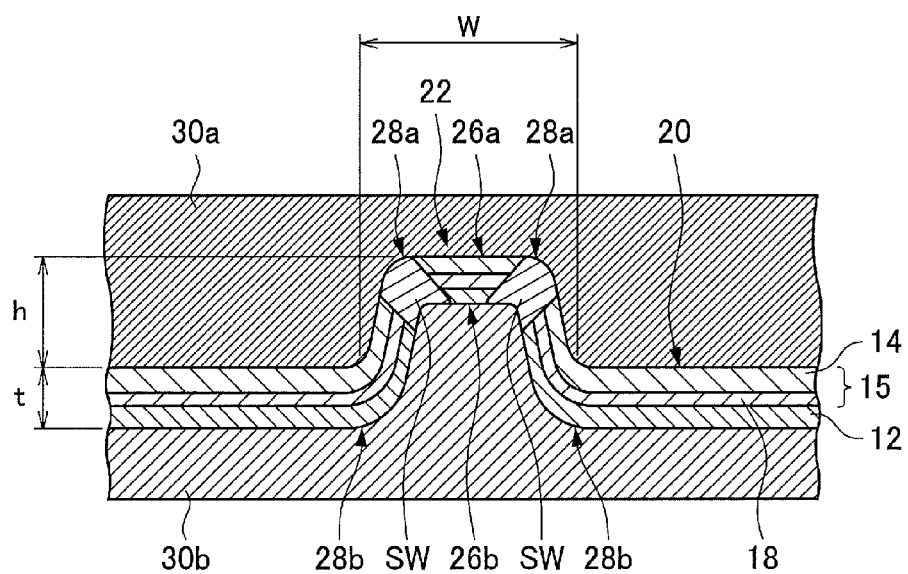
FIG. 4C illustrates an example of a method for producing a panel member and a dash panel.

FIGS. 3A, 3B, 4A, 4B, and 4C illustrate an example of a method for producing the panel member 10 and the dash panel 20. It should be noted that FIGS. 4A, 4B, and 4C are sectional views of the panel member 10 and the dash panel 20 in the vicinity of the working scheduled portion 10a.

As shown in FIG. 3A, for example, first, a main body 12 and patch panels 14 are prepared, and patch members 15 are constructed by applying a vibration attenuating resin layer 18 on each of the patch panels 14. Then, as shown in FIGS. 3B and 4A, the main body 12 and the vibration attenuating resin layer 18 are made to closely contact with each other, and the patch members 15 are affixed on the main body 12. Alternatively, as shown in FIG. 3A, an acrylic resin for the vibration attenuating resin layer 18 is applied on predetermined areas 16 of the main body 12, and then, as shown in FIGS. 3B and 4A, the patch panels 14 are affixed on the areas 16 that are applied with the acrylic resin. Thus, a vibration attenuating resin layer 18 is formed between the main body 12 and the patch panels 14.

Then, as shown in FIG. 4B, the main body 12 and the patch panel 14 are spot-welded at a working scheduled portion 10a. Specifically, as shown in FIG. 1, the main body 12 and the patch panel 14 are spot-welded so that multiple spot-welded portions SW will be formed at each of the working scheduled portions 10a. In this embodiment, the spot welding is performed at a working scheduled portion 10a so that multiple spot-welded portions SW are arranged in two rows. Thus, a panel member 10 is completed.

Next, as shown in FIG. 4C, bead working is performed on the panel member 10 by using a pair of punches 30a and 30b of a press machine. Specifically, the panel member 10 is held (pressed) by the pair of the punches 30a and 30b so that a protrusion 26a will be formed in the patch panel 14 and so that a protrusion 26b will be formed in the main body 12 at each of the working scheduled portions 10a. Thus, a bead portion 22 formed of the protrusions 26a and 26b is formed.

In this embodiment, when the bead working is performed on the panel member 10, the main body 12 is cut into a predetermined shape (shape shown in FIG. 2) by the pair of the punches 30a and 30b. As a result, the dash panel 20 having the multiple bead portions 22 is completed. Thus, by cutting the main body 12 into the predetermined shape while the multiple bead portions 22 are formed, the dash panel 20 is produced in a short time.

Here, in this embodiment, as shown in FIG. 4C, each of the bead portions 22 is formed so that the patch panel 14 side will protrude. More specifically, the bead portion 22 has an approximately trapezoidal shape, in which the patch panel 14 side is the top in a sectional view. By thus forming each of the bead portions 22, in the dash panel 20, a pair of bent portions 28a is formed on the top side of each of the bead portions 22, and a pair of bent portions 28b is formed at a base of each of the bead portions 22. In this embodiment, the above described spot welding is performed on the panel member 10 beforehand so that the multiple spot-welded portions SW are positioned at each of the bent portions 28a. It should be noted that some or all of the multiple bead portions may be formed so as to protrude in a direction opposite to the protruding direction in the examples shown in FIGS. 2 and 4C (that is, the main body 12 side).

As shown in FIGS. 4B and 4C, in the present invention, the bead portion 22 is a bent portion which has a height "h" that is 2 to 10 times greater than the plate thickness "t" of the panel member 10 and which has a width "W" that is 5 to 30 times greater than the plate thickness "t", for example. The width "W" may be measured by using each position which stands from a flat portion of the dash panel 20 by a predetermined height (for example, a position at the height of 3% of the height "h"), as each side of the bead portion.

Figure 5:
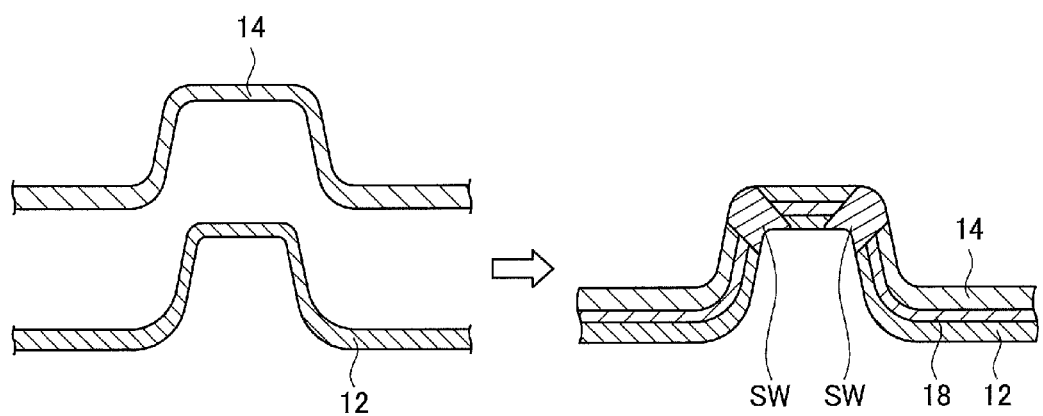
FIG. 5 is a schematic view which shows an example of bonding a main body and a patch panel with a vibration attenuating resin layer after the main body and the patch panel are respectively pressed.

In a case of making the main body 10 and the patch panels 14 of a soft steel, press working can be performed by a hot stamping method or the like as shown in FIG. 4C, in a condition in which the main body 10 and the patch panels 14 are spot-welded. On the other hand, in a case of making the main body 10 and the patch panels 14 of a relatively hard material which has a tensile strength of not less than 590 Mpa (such as high tensile steel), as shown in FIG. 5, it is preferable that the main body 10 and the patch panels 14 are bonded together with the vibration attenuating resin layer 18 and are spot-welded after the main body 10 and the patch panels 14 are respectively pressed.

Since the patch members 15 that are respectively constructed of the vibration attenuating resin layer 18 and the patch panel 14 are affixed on the main body 12, the panel member 10 in this embodiment exhibits a vibration attenuating function by "shear deformation" of the vibration attenuating resin layer 18 which occurs by bending vibration.

Figure 6:
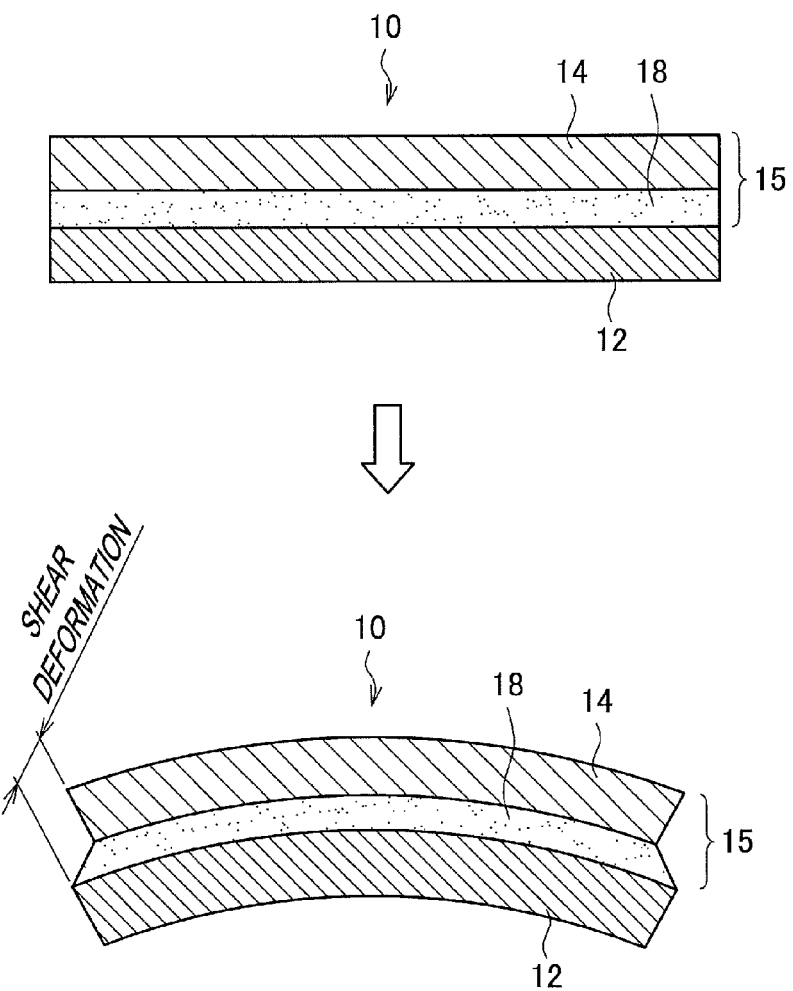
FIG. 6 is a schematic sectional view for explaining a vibration attenuating function that is performed by a vibration attenuating resin layer.

FIG. 6 is a schematic sectional view for explaining the vibration attenuating function that is performed by the vibration attenuating resin layer 18. As shown in FIG. 6, the panel member 10 can be deformed (curved) by bending vibration. At this time, in accordance with the bending vibration, the vibration attenuating resin layer 18 is stretched in the plane direction by with a bonding interface between the patch panel 14 and the main body 12, whereby deformation called shear deformation occurs in the vibration attenuating resin layer 18. Then, the vibration energy is converted into thermal energy by the shear deformation of the vibration attenuating resin layer 18, whereby a vibration attenuating effect is obtained.

In the panel member 10 relating to the present invention, as described above, the main body 12 and the patch panels 14 are spot-welded beforehand at the working scheduled portions 10a. Therefore, the rigidity of the bead portions 22 is sufficiently improved in the dash panel 20 that is produced by using the panel member 10, without increasing the thickness of the patch panels 14. Accordingly, the vibration characteristic of the dash panel 20 is improved without increasing the thickness of the panel member 10.

In this embodiment, after the patch panels 14 are affixed on the main body 12, the bead portions 22 are formed. In this case, the vibration attenuating resin layer 18 that has a uniform thickness is formed at the entire area of the bead portions 22 between the main body 12 and each of the patch panels 14, and therefore, the vibration characteristic of the dash panel 20 is reliably improved.

Moreover, in this embodiment, when the main body 12 is cut into a predetermined shape, the bead portions 22 are formed. That is, the cutting of the main body 12 and the forming of the bead portions 22 are performed in a single step. Therefore, the working steps are not greatly increased, and the working cost is reduced.

The patch panel 14 may have any thickness as long as the patch panel 14 withstands the force of the vibration attenuating resin layer 18 in the plane direction when the "shear deformation" occurs in the vibration attenuating resin layer 18, which is described with reference to FIG. 6. In view of this, the patch panel 14 preferably has a plate thickness of not less than 0.3 mm and not greater than the plate thickness of the main body 12.

The thickness of the vibration attenuating resin layer 18 is preferably not less than 10 μm and not greater than 1000 μm, and more preferably not less than 30 μm and not greater than 100 μm. Thus, the vibration of the panel member 10 is effectively attenuated.

In this embodiment, the pair of the patch members 14 is provided at a position that faces the cross member 24. The inventors of the present invention examined details of a transmission route of noise and vibration from the driving source of an automobile into the automobile (cabin). As a result, it was found that a primary transmission route of noise and vibration from the driving source into the automobile includes the bonded portion of the main body 12 and the cross member 24. In view of this, in this embodiment, the patch members 14 are provided at the positions that face the cross member 24. Thus, the transmission of noise and vibration into the automobile is more reliably suppressed.

In the embodiment described above, the case of bonding the main body 12 and the patch panels 14 at the bent portions 28a by the spot-welded portions SW is described. By thus providing the spot-welded portions SW at the bent portions 28a, even when the panel 10 is deformed and a force is applied in a direction for peeling off the patch panel 14 from the main body 12, since the main body 12 and the patch panel 14 are bonded together by the spot-welded portions SW, the patch panel 14 is not peeled off from the main body 12, and the deformation is reliably suppressed. Moreover, since the patch panel 14 is not peeled off from the main body 12, the vibration attenuating function is reliably performed by the vibration attenuating resin layer 18.

Figure 7:
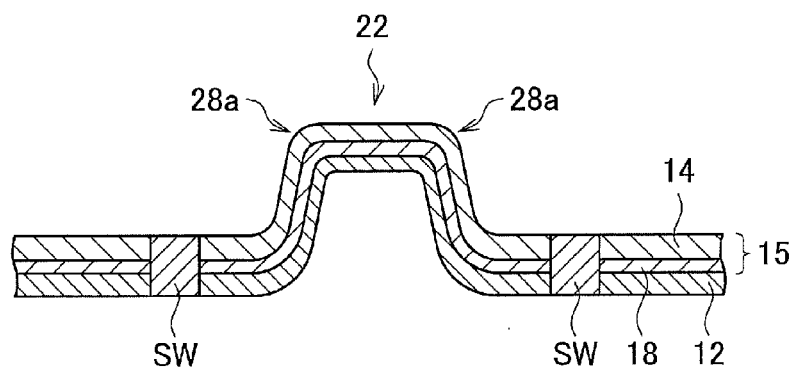
FIG. 7 is a schematic view showing an example of providing a bead portion at a portion which is not spot-welded.

In another case, the main body 12 and the patch panel 14 may be spot-welded at portions other than the bent portions 28a. For example, as shown in the sectional view in FIG. 7, the bead portion 22 may be provided at a portion which is not spot-welded. Also, in this case, the vibration attenuating function of the vibration attenuating resin layer 18 is obtained, and the effect of providing the bead portion 22 for improving the rigidity is obtained. For another example, the main body 12 and the patch panel 14 may be spot-welded at a portion (flat portion) between the pair of the bent portions 28a of the bead portion 22.

Although the panel member 10 that has the pair of the patch members 15 is described in the above embodiment, the number of the patch members 15 is not limited to the above example. For example, the panel member 10 may have one patch member 15 or may have three or more patch members 15. That is, by affixing the patch member on any portion, of which vibration characteristic needs to be improved, in the panel member 10 relating to the present invention, the vibration characteristic of the transportation vehicle part is efficiently improved.

Figure 8:
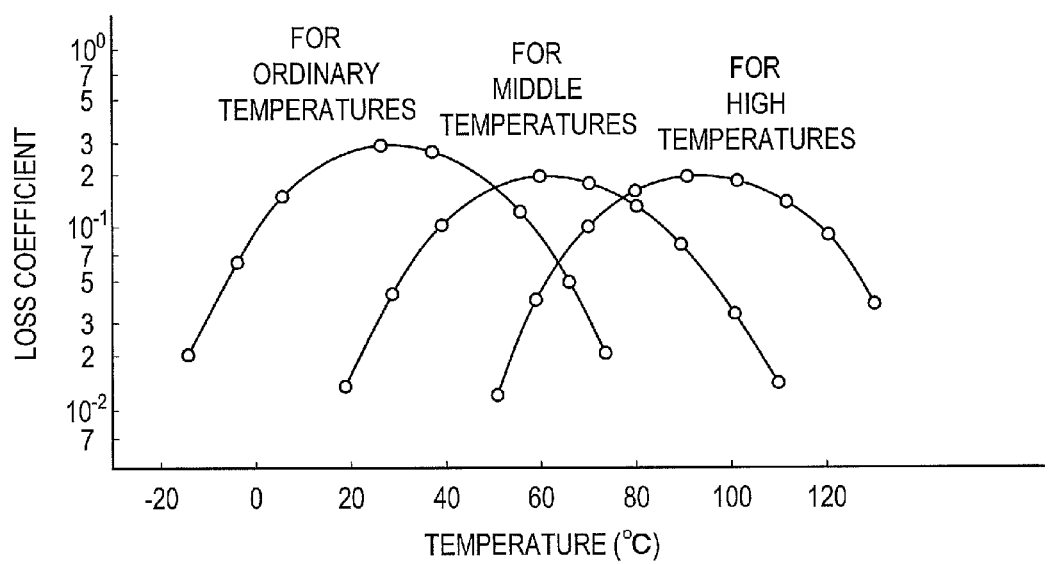
FIG. 8 is a characteristic diagram showing multiple resins which have different temperature characteristics from each other.
Figure 9:
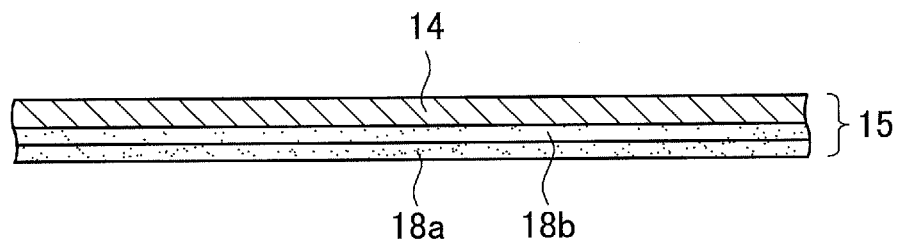
FIG. 9 is a sectional view showing an example of making a vibration attenuating resin layer of multiple resin layers.
Figure 10:
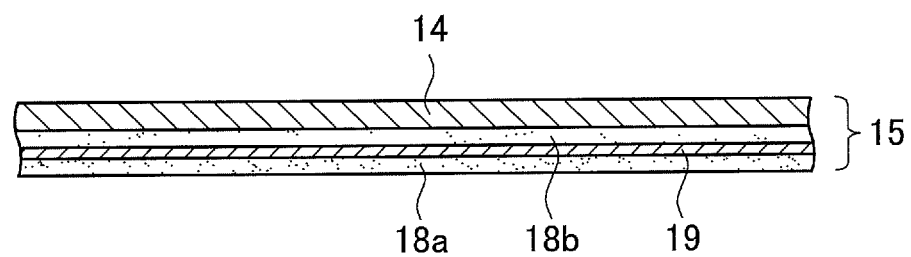
FIG. 10 is a sectional view showing an example of making a vibration attenuating resin layer of multiple resin layers.

The vibration attenuating resin layer 18 may be made of different kinds of multiple resins. In this case, the vibration attenuating resin layer 18 is made of multiple resins which have different temperature characteristics with each other. FIG. 8 is a characteristic diagram showing multiple resins which have different temperature characteristics from each other. In FIG. 8, a loss coefficient on the vertical axis is a parameter which indicates a vibration attenuating characteristic, and the vibration attenuating characteristic is higher when the value of the loss coefficient is greater. FIGS. 9 and 10 are sectional views showing examples of making a vibration attenuating resin layer 18 of multiple resin layers 18a and 18b. Here, the resin layer 18a exhibits a vibration attenuating function at high temperatures (corresponds to a material for high temperatures shown in FIG. 8), and the resin layer 18b exhibits a vibration attenuating function at ordinary temperatures (corresponds to a material for ordinary temperatures shown in FIG. 8). FIG. 9 shows an example of laminating the resin layer 18b immediately on the resin layer 18a, and FIG. 10 shows an example of inserting a panel 19 between the resin layer 18a and the resin layer 18b. Thus, in the panel member 10, the vibration attenuating function is performed in multiple conditions of different temperatures.

Figure 11:
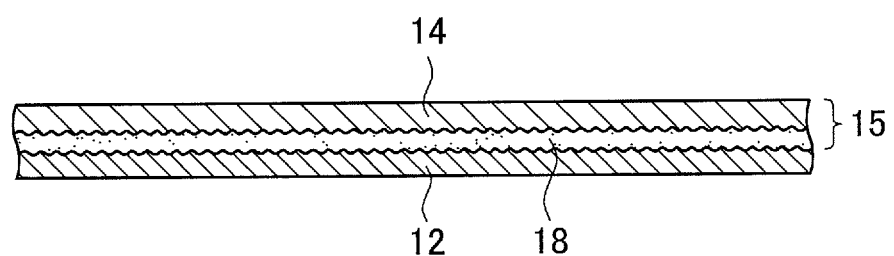
FIG. 11 is a sectional view showing an example of performing a fine uneven surface processing on a surface of a main body or a surface of a patch panel, which contact a vibration attenuating resin layer.

FIG. 11 is a sectional view showing an example of performing a fine uneven surface processing (such as satin finish processing) on a surface of the main body 12 or a surface of the patch panel 14, which contact the vibration attenuating resin layer 18. The surface processing is performed by a method such as sand blast, etching, etc. Thus, an anchoring effect is obtained by the surface processing, and the adhesion of the main body 12 or the patch panel 14 with respect to the vibration attenuating resin layer 18 is increased, whereby the vibration attenuating function is reliably performed by the "shear deformation" described above.

Figure 12:
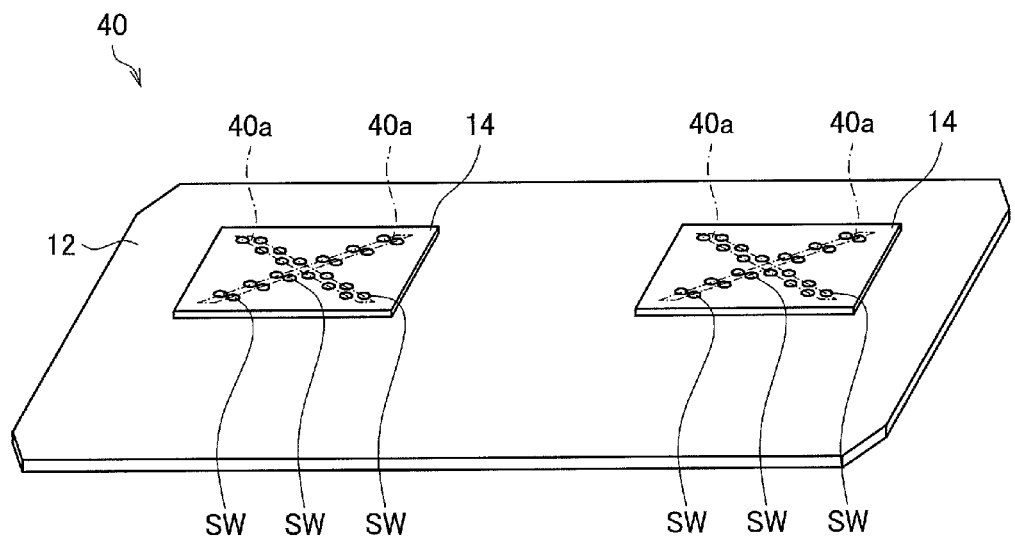
FIG. 12 is an external perspective view of a panel member according to another embodiment of the present invention.

Although the case of arranging the multiple working scheduled portions 10a so as to extend mutually in parallel is described in the above embodiment, the arrangement of the working scheduled portions is not limited to the example descried above. For example, as in the panel member 40 shown in FIG. 12, a pair of working scheduled portions 40a may be arranged so as to cross each other in each of the patch members 15. In this case, spot-welded portions SW are formed along each of the working scheduled portions 40a.

Although the dash panel 20 is described as an example of the transportation vehicle part in the above embodiment, the panel member of the present invention can be formed into another transportation vehicle part.

Figure 13:
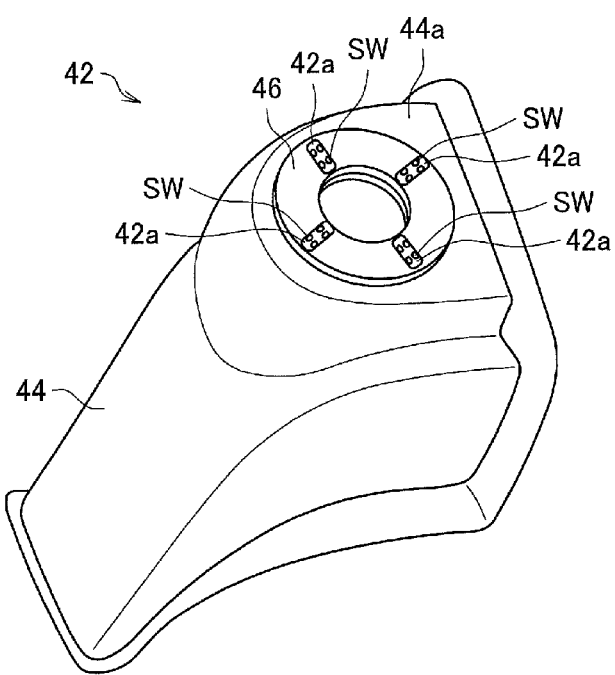
FIG. 13 is an external perspective view of a shock absorber tower.

For example, as shown in FIG. 13, a shock absorber tower 42 may be produced by using the panel member relating to the present invention. The shock absorber tower 42 includes a main body 44, which contains a shock absorber that is not shown in the figure, and a hollow disk-shaped patch panel 46, which is affixed on the main body 44 via the vibration attenuating resin layer 18 that is not shown in the figure. Here, a patch member 45 is constructed of the patch panel 46 and the vibration attenuating resin layer 18. The patch member 45 is affixed on a top portion 44a (portion that supports a shock absorber that is not shown in the figure) of the main body 44. The main body 44 and the patch panel 46 are respectively made of materials similar to the main body 12 and the patch panel 14 described above. In the shock absorber tower 42, the top portion 44a and the patch member 45 are formed with multiple bead portions 42a which extend radially. The bead portions 42a have the structure similar to the bead portion 22. Specifically, the bead portions 42a are formed by performing the bead working on the top portion 44a and the patch member 45 as in the case of the bead portion 22 described above. The main body 44 (top portion 44a) and the patch panel 46 are bonded together by multiple spot-welded portions SW which are formed at the bead portions 42a. The multiple spot-welded portions SW are formed before the panel member is formed into the shock absorber tower 42, that is, formed in the panel member beforehand.

Here, the inventors of the present invention examined details of a transmission route of noise and vibration from the driving source of an automobile into the automobile. As a result, a primary transmission route of noise and vibration from the driving source into the automobile includes a shock absorber tower. Moreover, according to the result of the examination that was conducted by the inventors of the present invention, vibration is greater at the top portion of the shock absorber tower. Therefore, the inventors of the present invention arranged the patch member 45 on the top portion 44a of the shock absorber tower 42. Thus, the rigidity of the top portion 44a is improved, whereby noise and vibration are efficiently suppressed in the shock absorber tower 42.

Figure 14A:
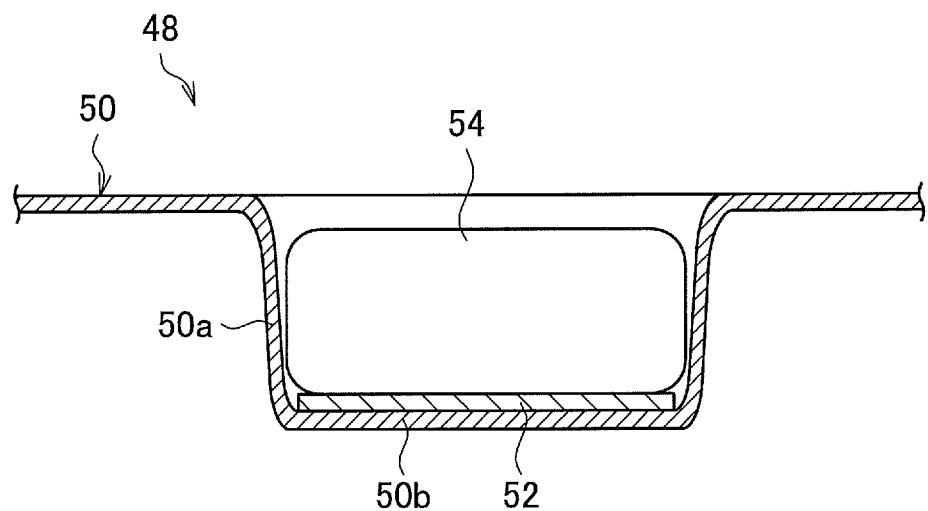
FIG. 14A is a sectional view of a trunk floor panel that is viewed from a side.
Figure 14B:
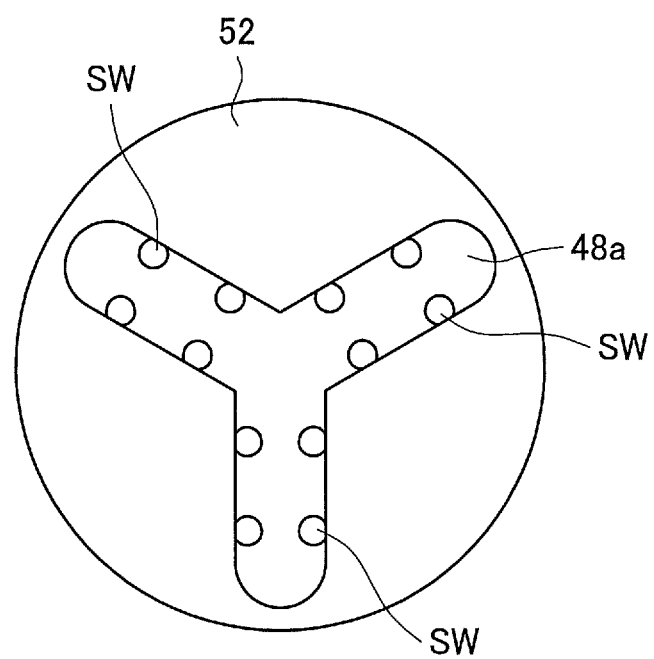
FIG. 14B is a plan view of a patch member.

For another example, as shown in FIGS. 14A and 14B, a trunk floor panel 48 may be produced by using the panel member relating to the present invention. FIG. 14A is a sectional view of the trunk floor panel 48 that is viewed from a side, and FIG. 14B is a plan view of a patch member 52. In the example shown in FIGS. 14A and 14B, the patch member 52 is constructed of a patch panel and a vibration attenuating resin layer, and the patch panel is affixed on a main body 50 via the vibration attenuating resin layer, as in the case of the above embodiment. As shown in FIG. 14A, the trunk floor panel 48 includes the main body 50, which constitutes a floor portion of a trunk, and the patch member 52, which is affixed on the main body 50 via an adhesive layer that is not shown in the figures. The main body 50 has a storage portion 50a for storing a spare tire 54. The patch member 52 is affixed on a bottom 50b of the storage portion 50a.

Figure 15:
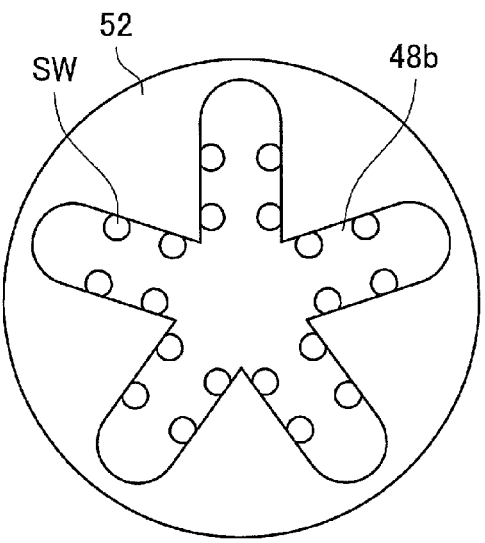
FIG. 15 is a plan view of another example of a patch member.

As shown in FIG. 14B, the patch member 52 has a disk shape. In the trunk floor panel 48, the bottom 50b and the patch member 52 are formed with a bead portion 48a. The bead portion 48a is formed so as to radially extend from the center of the bottom 50b and the patch member 52 in three directions. The bead portion 48a has the structure similar to the bead portion 22 described above. Specifically, the bead portion 48a is formed by performing the bead working on the bottom 50b and the patch member 52 as in the case of the bead portion 22 described above. The main body 50 (bottom 50b) and the patch member 52 are bonded together by multiple spot-welded portions SW which are formed in the bead portion 48a, as in the case of the main body 12 and the patch member 14 described above. The multiple spot-welded portions SW are formed before the panel member is formed into the trunk floor panel 48, that is, formed in the panel member beforehand. The bead portion is preferably formed so as to radially extend from the center of the bottom 50b and the patch member 52 in directions of not less than three in odd numbers. For example, as shown in FIG. 15, the bead portion 48b may be formed so as to radially extend from the center of the main body 50 (refer to FIG. 14A) and the patch member 52 in five directions.

By providing the patch member 52 as described above, the rigidity of the bottom 50b of the storage portion 50a is improved. Thus, even when the spare tire 54 shakes within the storage portion 50a while the automobile travels, the vibration of the storage portion 50a is suppressed. As a result, transmission of noise and vibration from the trunk floor panel 48 into the automobile is suppressed.

Moreover, by forming the bead portion so as to radially extend from the center of the bottom 50b and the patch member 52 in the directions of not less than three in odd numbers, vibration having the lowest frequency, that is, vibration of a primary mode which resonates first after the vibration starts, is sufficiently suppressed at the center of the bottom 50b. Thus, the transmission of noise and vibration from the trunk floor panel 48 into the automobile is reliably suppressed.

Although the case of producing the transportation vehicle part by performing the bead working on the panel member relating to the present invention is described in the above embodiment, the transportation vehicle part may be produced by performing another working on the panel member.

Figure 16:
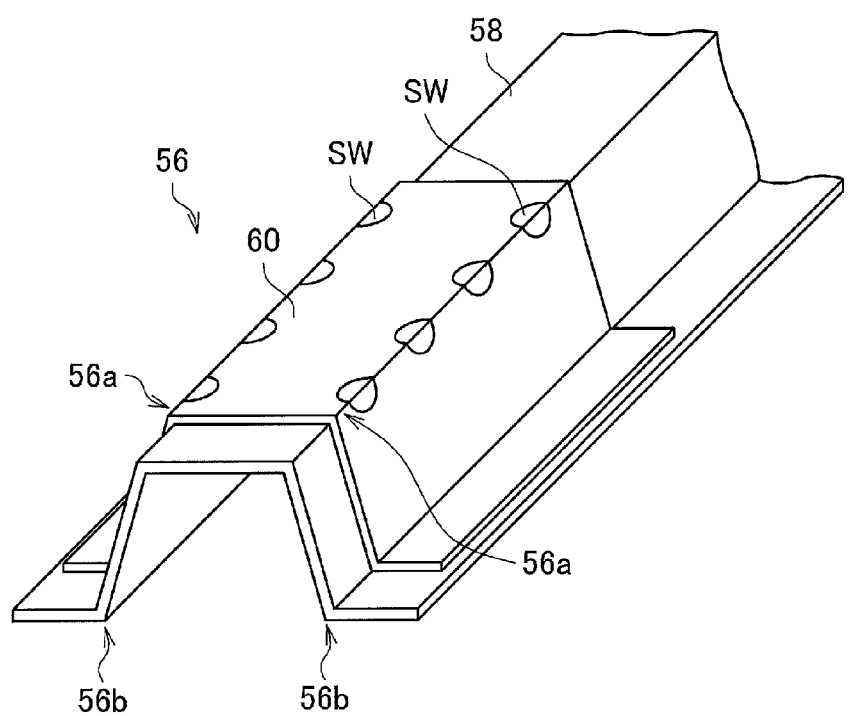
FIG. 16 is an external perspective view of a floor tunnel part.

For example, as shown in FIG. 16, a floor tunnel part 56 (member for constructing a floor of an automobile) may be produced by bending the panel member relating to the present invention by a press machine or the like. The floor tunnel part 56 includes a main body 58 and a patch member 60. Here, the patch member 60 is constructed of a patch panel and a vibration attenuating resin layer that is not shown in the figure, and the patch panel is affixed on the main body 60 via the vibration attenuating resin layer, as in the case of the above embodiment. The patch member 60 is affixed so as to cover at least a part of the main body 58 from above. The main body 58 and the patch panel of the patch member 60 are respectively made of materials similar to the main body 12 and the patch panel 14 described above.

The main body 58 and the patch member 60 are respectively formed so as to protrude upwardly. Thus, a pair of bent portions 56a is formed at a top side of the floor tunnel part 56, and a pair of bent portions 56b is formed at a base of the floor tunnel part 56. The main body 58 and the patch member 60 are bonded together at each of the bent portions 56a by multiple spot-welded portions SW. The multiple spot-welded portions SW are formed before the panel member is formed into the floor tunnel part 56, that is, formed in the panel member beforehand. More specifically, in the panel member, portions which become a pair of the bent portions 56a are spot-welded beforehand.

By providing the patch member 60 as described above, the rigidity of the floor tunnel part 56 is improved, whereby the vibration characteristic of the floor tunnel part 56 is improved. Thus, transmission of vibration and noise, which are generated from the driving source, via the floor tunnel part 56 into the automobile is suppressed.

Although details are not described by referring to figures, other automobile parts (transportation vehicle parts) such as a floor panel, wheel house inner, and the like, may be produced by using the panel member relating to the present invention.

The effects of the present invention will be described by using examples hereinafter, but the present invention is not limited to the following examples.

EXAMPLES

Figure 17:
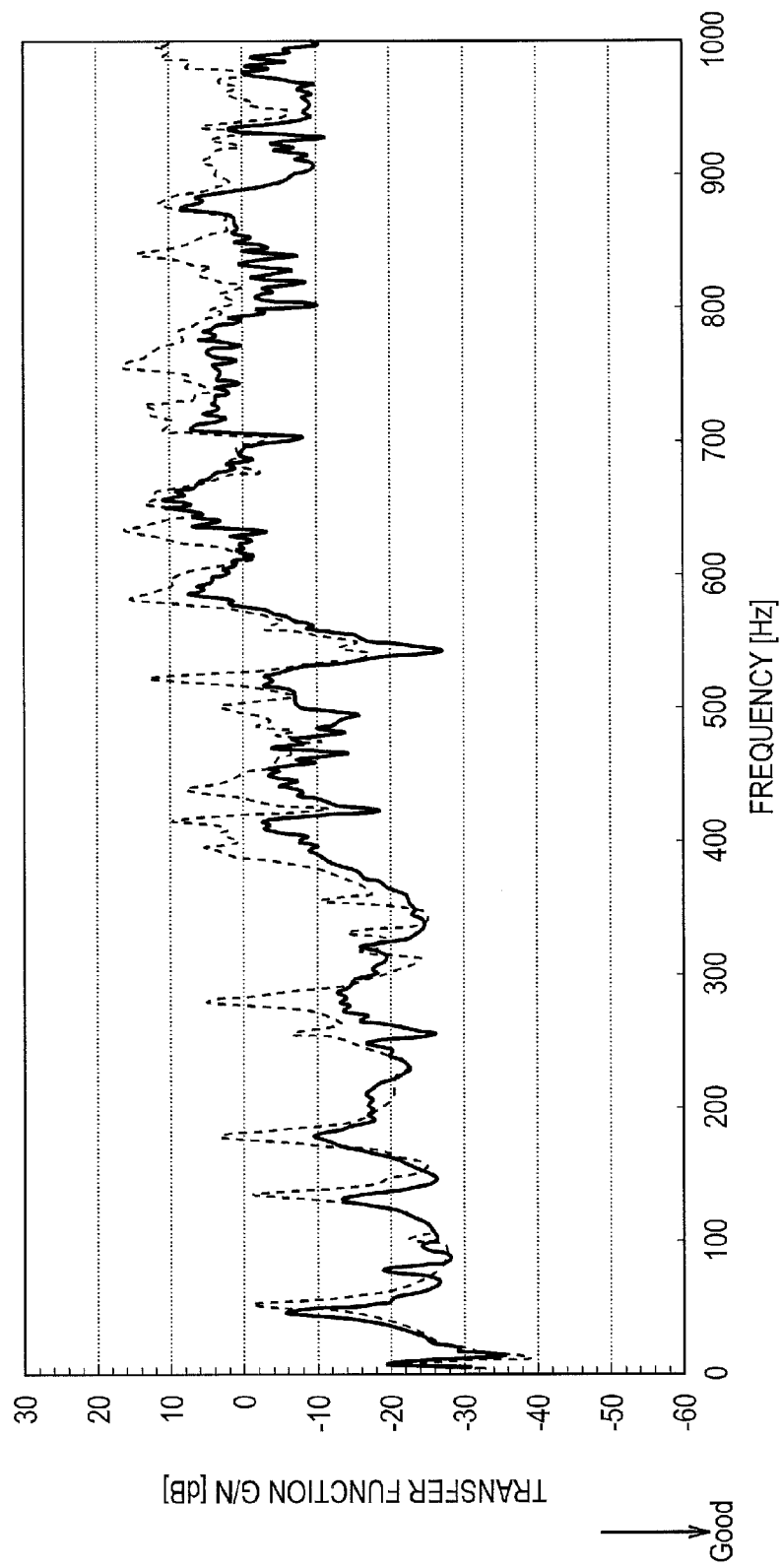
FIG. 17 is a characteristic diagram showing a transfer function of a main body which was affixed with a patch member and a transfer function of a main body which was not affixed with a patch member.
Figure 23:
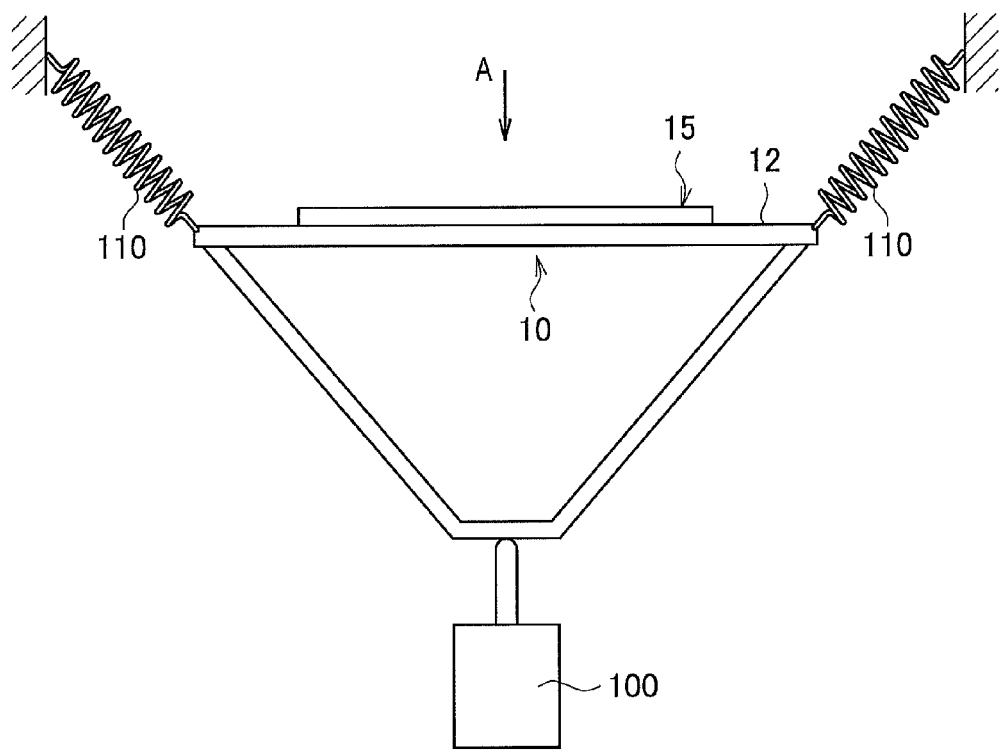
FIG. 23 is a schematic view showing a testing machine for measuring the characteristics shown in FIGS. 17 to 22.
Figure 24:
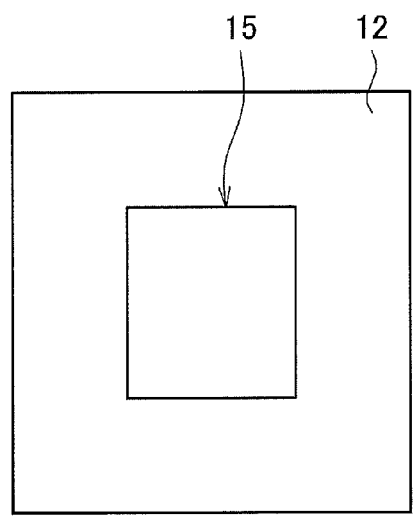
FIG. 24 is a plan view showing a condition that is viewed from the direction of an arrow "A" in FIG. 23.

FIGS. 17 to 22 are characteristic diagrams for explaining the vibration attenuating effect of the vibration attenuating resin layer 18. FIG. 17 is a characteristic diagram showing a transfer function of the main body 12 which was affixed with the patch member 15 and a transfer function of the main body 12 which was not affixed with the patch member 15. Here, the transfer function was measured by using a testing machine shown in FIG. 23. As shown in FIG. 23, the panel member 10, in which the batch member 15 was affixed on the main body 12, was held by springs 110 and was vibrated by an excitation machine 100. FIG. 24 is a plan view showing a condition which is viewed from the direction of an arrow "A" in FIG. 23. As shown in FIGS. 23 and 24, the main body 12 and the patch panel 14 were bonded together via the vibration attenuating resin layer 18, and an acceleration was measured by an accelerometer when the panel member 10 was vibrated by the excitation machine 100.

FIGS. 17 to 22 show transfer functions that were obtained from the measured accelerations. Here, the lower value of the transfer function indicates that the vibration is more effectively suppressed. As shown in FIG. 17, the value of the transfer function was greatly decreased in the characteristic (solid line) which was obtained in the case of affixing the patch member 15 on the main body 12 when compared with the characteristic (broken line) which was obtained in the case of not affixing the patch member 15 on the main body 12. Accordingly, vibration was effectively suppressed by affixing the patch member 15.

In general, noise due to vibration is generated at frequencies of not greater than 1 kHz. Therefore, according to the result shown in FIG. 17, vibration is effectively attenuated at frequencies of not greater than 1 kHz, and generation of noise is suppressed.

Figure 18:
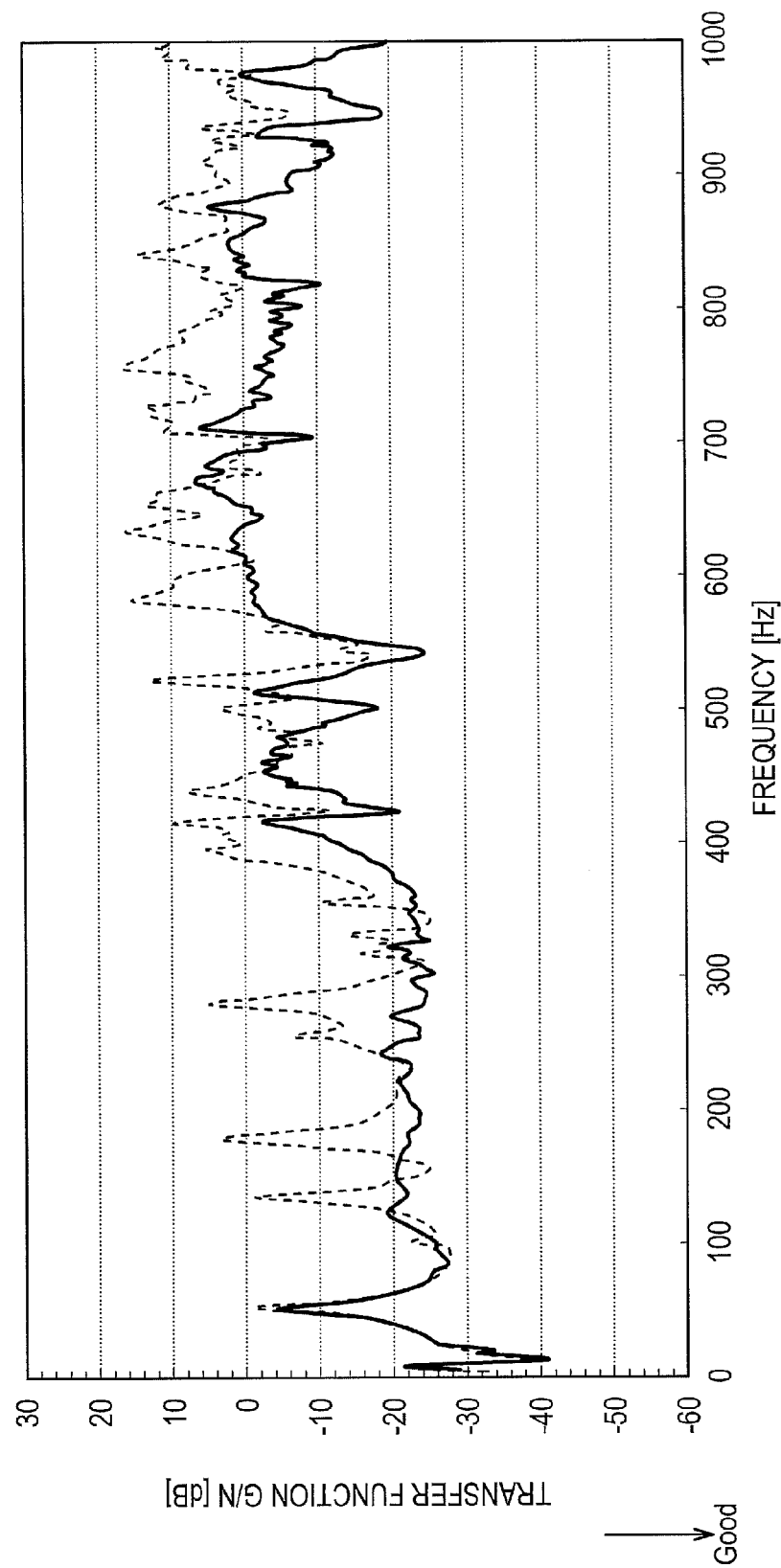
FIG. 18 is a characteristic diagram in a case in which a total plate thickness of a main body that was affixed with a patch member was made the same as the plate thickness of a main body that was not affixed with a patch member.

FIG. 18 is a characteristic diagram showing a transfer function of the main body 12 which was affixed with the patch member 15 and a transfer function of the main body 12 which was not affixed with the patch member 15, and FIG. 18 shows a case in which the total plate thickness of the main body 12 that was affixed with the patch member 15 was made the same as the plate thickness of the main body 12 that was not affixed with the patch member 15. Here, in the case of affixing the patch member 15 on the main body 12, a steel plate having a thickness of 0.6 mm, a length of 500 mm, and a width of 600 mm was used as the main body 12, and a steel plate having a thickness of 0.4 mm, a length of 400 mm, and a width of 500 mm was used as the patch panel 14. In the case of not affixing the patch member 15 on the main body 12, a steel plate having a thickness of 1.0 mm, a length of 500 mm, and a width of 600 mm was used as the main body 12. As shown in FIG. 18, the value of the transfer function was greatly decreased in the characteristic (solid line) which was obtained in the case of affixing the patch member 15 on the main body 12 when compared with the characteristic (broken line) which was obtained in the case of not affixing the patch member 15 on the main body 12. Since the total plate thickness of the main body 12 that was affixed with the patch member 15 was made the same as the plate thickness of the main body 12 that was not affixed with the patch member 15, it was found that the decrease in the value of the transfer function is greatly affected by the vibration attenuating effect that is obtained by the shear deformation of the vibration attenuating resin layer 18.

Figure 19:
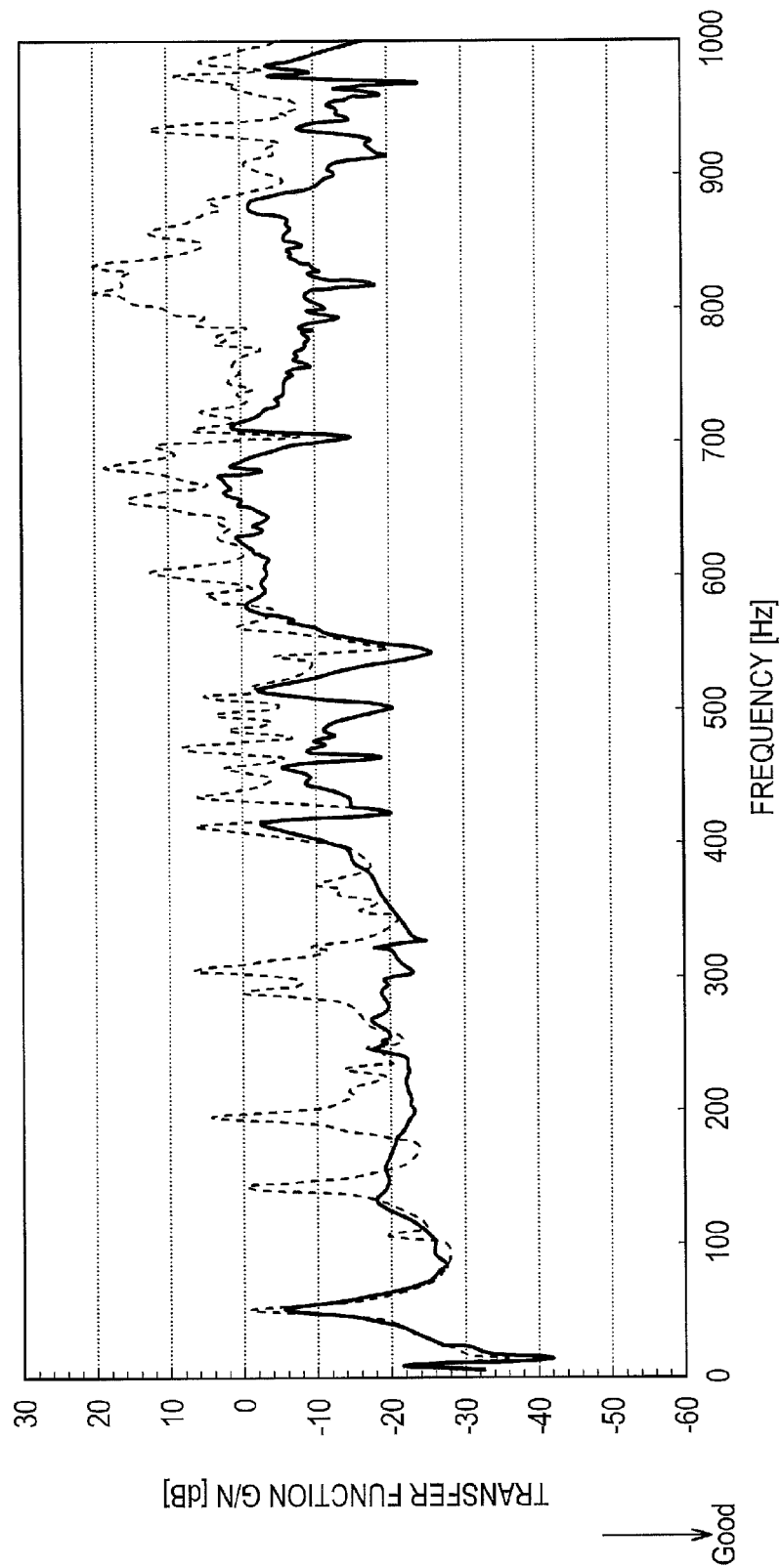
FIG. 19 shows a case in which a total plate thickness of a main body that was affixed with a patch member was made the same as the plate thickness of a main body that was not affixed with a patch member.

Similarly, FIG. 19 is a characteristic diagram showing a transfer function of the main body 12 which was affixed with the patch member 15 and a transfer function of the main body 12 which was not affixed with the patch member 15, and FIG. 19 shows a case in which the total plate thickness of the main body 12 that was affixed with the patch member 15 was made the same as the plate thickness of the main body 12 that was not affixed with the patch member 15. Here, in the case of affixing the patch member 15 on the main body 12, a steel plate having a thickness of 0.6 mm, a length of 500 mm, and a width of 600 mm was used as the main body 12, and a steel plate having a thickness of 0.6, a length of 400 mm, and a width of 500 mm was used as the patch panel 14. In the case of not affixing the patch member 15 on the main body 12, a steel plate having a thickness of 1.2 mm, a length of 500 mm, and a width of 600 mm was used as the main body 12. As shown in FIG. 19, the value of the transfer function was greatly decreased in the characteristic (solid line) which was obtained in the case of affixing the patch member 15 on the main body 12 when compared with the characteristic (broken line) which was obtained in the case of not affixing the patch member 15 on the main body 12. Since the total plate thickness of the main body 12 that was affixed with the patch member 15 was made the same as the plate thickness of the main body 12 that was not affixed with the patch member 15, it was found that the decrease in the value of the transfer function is greatly affected by the vibration attenuating effect that is obtained by the shear deformation of the vibration attenuating resin layer 18.

Figure 20:
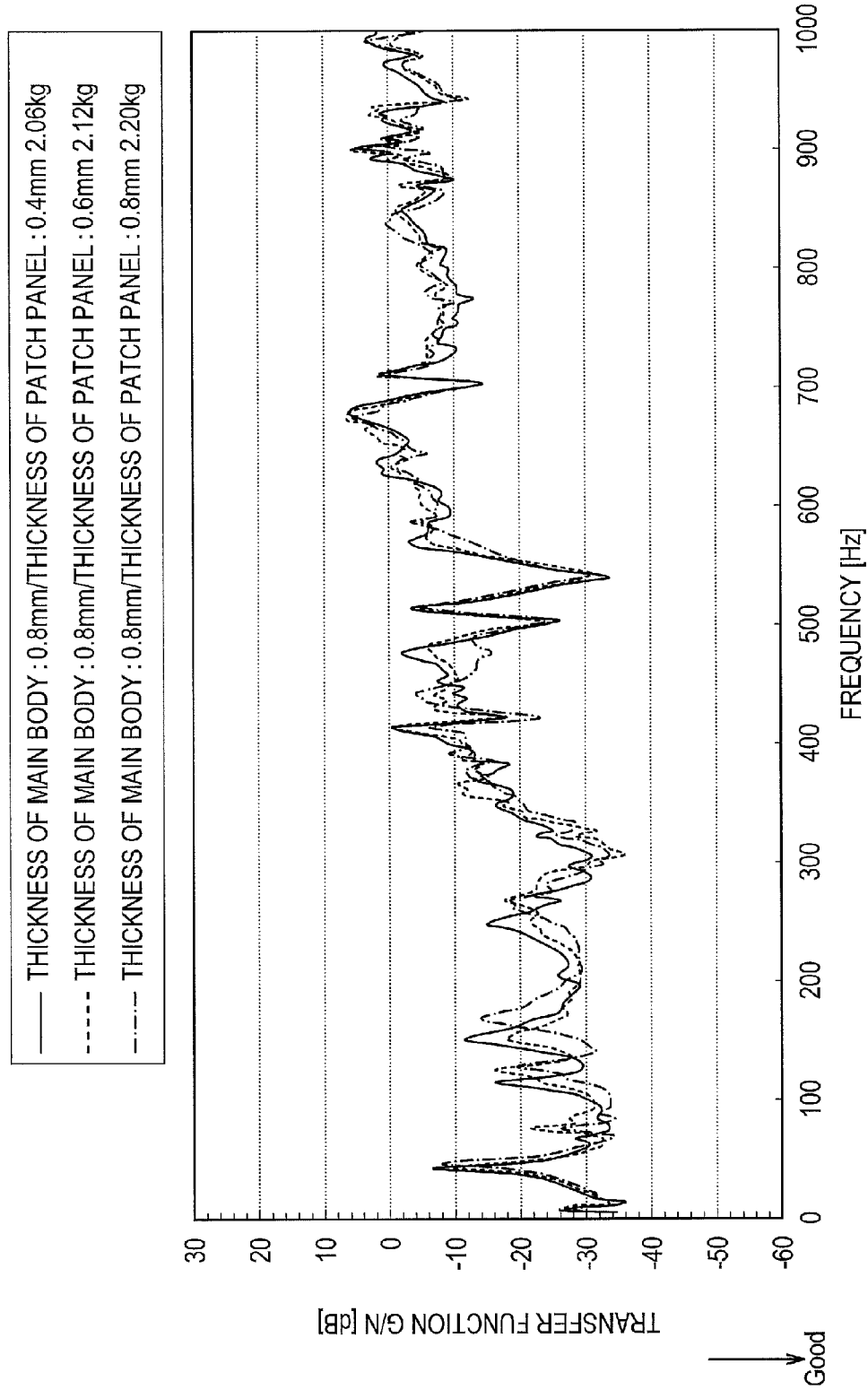
FIG. 20 is a characteristic diagram showing a transfer function of each of main bodies which had the same shape and which were respectively affixed with panel members that included patch panels having different thicknesses from each other.

FIG. 20 is a characteristic diagram showing a transfer function of each of main bodies 12 which had the same shape and which were respectively affixed with panel members 15 that included patch panels 14 having different thicknesses from each other. Here, a steel plate having a thickness of 0.8 mm, a length of 500 mm, and a width of 500 mm was used as the main body 12, and a steel plate having a thickness of 0.4 mm, a length of 250 mm, and a width of 250 mm, a steel plate having a thickness of 0.6 mm, a length of 250 mm, and a width of 250 mm, or a steel plate having a thickness of 0.8 mm, a length of 250 mm, and a width of 250 mm was used as the patch panel 14. As shown in FIG. 20, the value of the transfer function did not greatly vary even when the thickness of the patch panel 14 was changed. Accordingly, in the case of affixing the panel member 15 on the main body 12, the decrease in the value of the transfer function was greatly affected by the vibration attenuating effect that was obtained by the shear deformation of the vibration attenuating resin layer 18.

Figure 21:
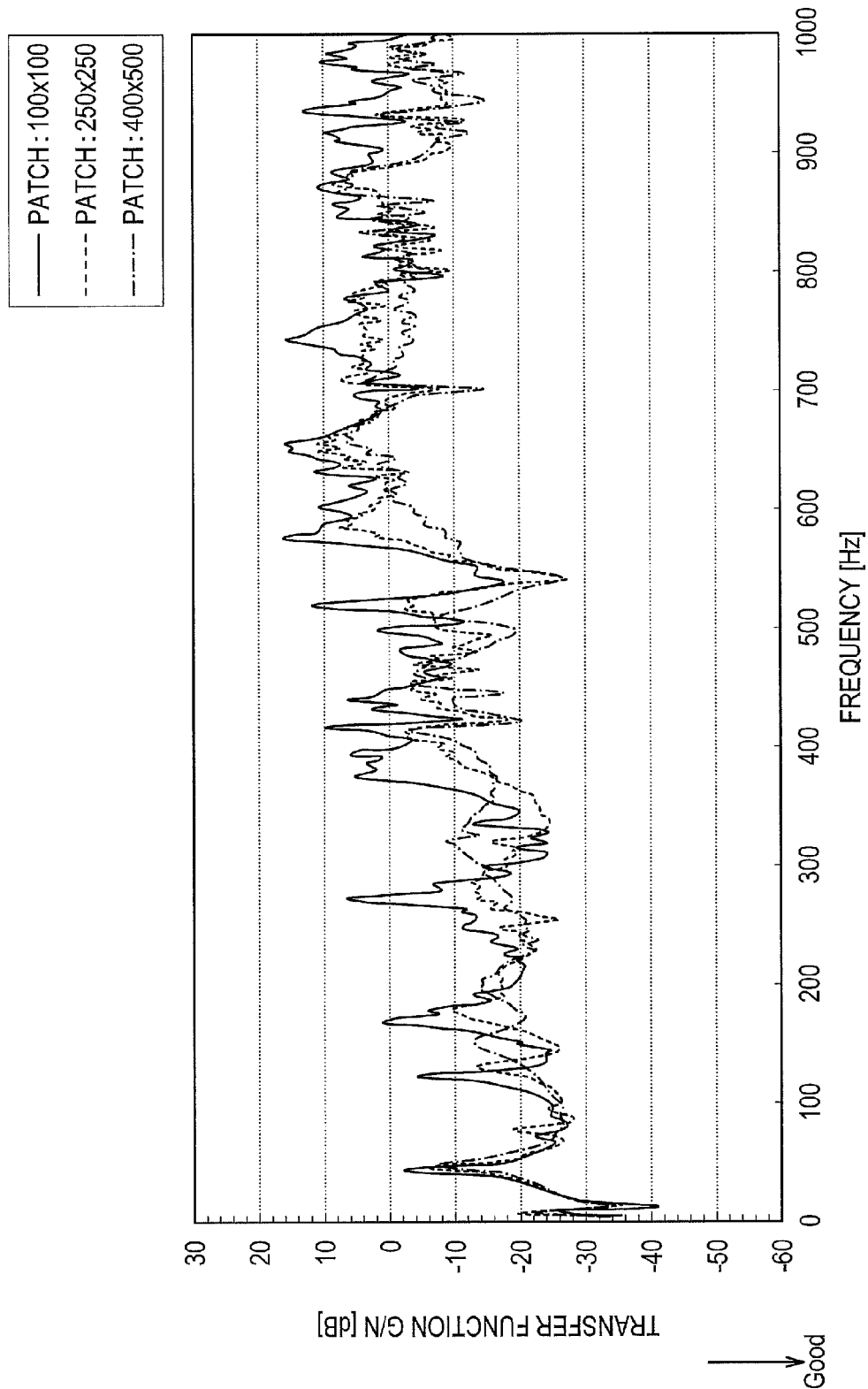
FIG. 21 is a characteristic diagram showing a case of respectively affixing patch members, which had different dimensions from each other, on main bodies.

FIG. 21 is a characteristic diagram showing a case of respectively affixing patch members, which had different dimensions from each other, on the main bodies 12. Here, a steel plate having a thickness of 1.0 mm, a length of 500 mm, and a width of 600 mm was used as the main body 12, and a steel plate having a thickness of 0.5 mm was used as the patch panel 14. As the patch panel 14, a steel plate having a length of 250 mm and a width of 250 mm, a steel plate having a length of 100 mm and a width of 100 mm, or a steel plate having a length of 400 mm and a width of 500 mm was used. As shown in FIG. 21, when the area of the patch panel 14 was greater, the vibration attenuating effect was greater.

Figure 22:
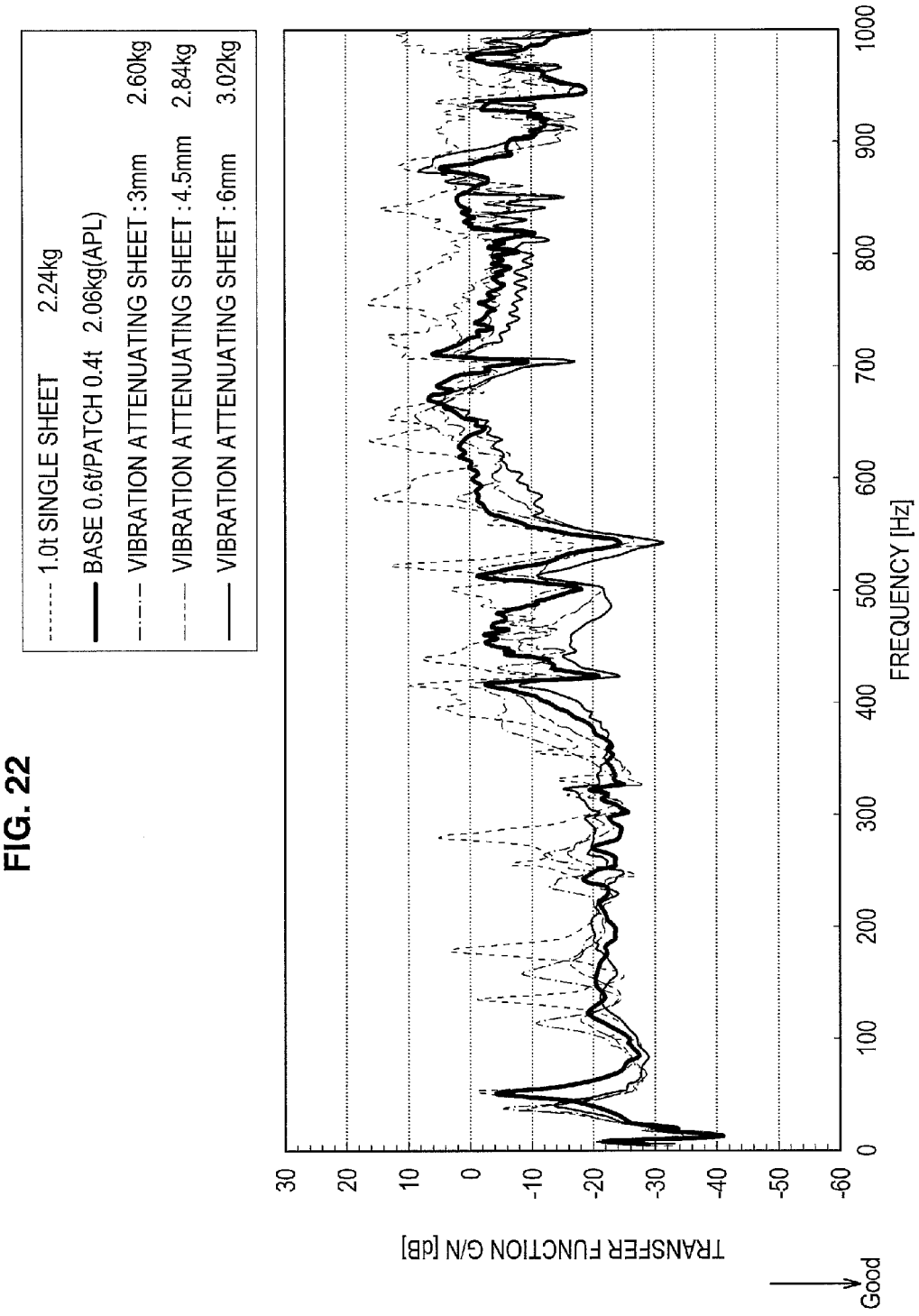
FIG. 22 is a characteristic diagram showing a case of affixing a patch member according to an embodiment on a main body in comparison with a case of affixing each of vibration attenuating sheets (thickness of 3 mm, 4.5 mm, and 6 mm).

FIG. 22 is a characteristic diagram showing a case of affixing the patch member 15 according to an embodiment on the main body 12 in comparison with a case of affixing each of vibration attenuating sheets (asphalt sheets; thickness of 3 mm, 4.5 mm, and 6 mm). Here, in the case of affixing the patch member 15 on the main body 12, a steel plate having a thickness of 0.6 mm, a length of 500 mm, and a width of 600 mm was used as the main body 12, and a steel plate having a thickness of 0.4 mm, a length of 400 mm, and a width of 500 mm was used as the patch panel 14. In the case of affixing the vibration attenuating sheet (thickness of 3 mm, 4.5 mm, or 6 mm) on the main body 12, a steel plate having a thickness of 1.0 mm, a length of 500 mm, and a width of 600 mm was used as the main body 12, and a vibration attenuating sheet (thickness of 3 mm, 4.5 mm, or 6 mm) having a length of 320 mm and a width of 510 mm was used. As shown in FIG. 22, when the characteristic (solid line) which was obtained in the case of affixing the patch member 15 on the main body 12 is compared with the case of affixing the vibration attenuating sheet having the thickness of 3 mm, 4.5 mm, or 6 mm on the main body 12, a vibration attenuating characteristic which is equivalent to the vibration attenuating characteristic of the vibration attenuating sheet having the thickness of 4.5 mm was obtained by affixing the patch member 15. However, the weight was 2.06 kg when the patch member 15 was affixed on the main body 12, whereas the weight was 2.84 kg when the vibration attenuating sheet having the thickness of 4.5 mm was affixed on the main body 12. Therefore, according to this embodiment, the weight is reduced compared with the case of affixing the vibration attenuating sheet. Moreover, the total thickness of the main body 12 and the patch member 15 was 1 mm in this embodiment and was smaller than the thickness of the main body 12 that was affixed with the vibration attenuating sheet with the thickness of 4.5 mm, and therefore, a space is easily secured when the main body 12 affixed with the patch member 15 is used in a vehicle.

In order to examine the effects of the present invention, the inventors of the present invention prepared panel members as an example and comparative examples 1 and 2. As shown in Table 1 described below, in the example and the comparative examples 1 and 2, a steel plate of 590 MPa class having a plate thickness of 0.5 mm, a length of 200 mm, and a width of 200 mm was used as the main body. As the patch member, a steel plate of 590 MPa class having a plate thickness of 0.5 mm, a length of 100 mm, and a width of 100 mm was used. The patch member was affixed at a center portion of the main body by using an acrylic resin. A linear bead portion having a height of 5 mm, a width of 20 mm, and a length of 100 mm was formed at a center portion of the panel member of each of the example and the comparative example 1. Moreover, the panel member of the example was spot-welded at a working scheduled portion (portion to be formed with the bead portion). More specifically, the spot welding was performed at portions which became a pair of bent portions (corresponding to the pair of the bent portions 28a in FIG. 4C) in the bead portion. The spot welding was performed so that five spot-welded portions would be positioned at equal intervals of 25 mm at each of the bent portions. Thus, the main body and the patch member were bonded together before the bead working.

TABLE 1

|  | Main body (steel plate of 590 MPa class) | | | Patch member (steel plate of 590 MPa class) | | | Adhesive layer | Bead | Welding |
| --- | --- | --- | --- | --- | --- | --- | --- | --- | --- |
|  | plate thickness (mm) | Length (mm) | Width (mm) | plate thickness (mm) | Length (mm) | Width (mm) |  |  |  |
| Example | 0.5 | 200 | 200 | 0.5 | 100 | 100 | Acrylic resin | Formed | Performed |
| Comparative example 1 |  |  |  |  |  |  |  | Formed | Not performed |
| Comparative example 2 |  |  |  |  |  |  |  | Not formed | Not performed |

A frequency of a primary mode of a panel member of each of the example and the comparative examples 1 and 2 having the above structures was measured by experiment. The measurement results are shown in the following Table 2. It should be noted that the frequency of each of the example and the comparative examples 1 and 2 is shown by a dimensionless value based on the frequency of the panel member of the comparative example 2 in Table 2.

TABLE 2

|  | Example | Comparative example 1 | Comparative example 2 |
|---|---|---|---|
| Frequency | 2.94 | 2.49 | 1.0 |

When the experiment result of the panel member of the comparative example 1 having the bead portion is compared with the experiment result of the comparative example 2 without the bead portion, the frequency of the primary mode of the panel member of the comparative example 1 was approximately 2.5 times greater than the frequency of the primary mode of the panel member of the comparative example 2. According to this result, by forming the bead portion, the frequency of the primary mode of the panel member is increased, whereby the vibration characteristic of the panel member in a low frequency region is improved. When the experiment result of the panel member of the example is compared with the experiment result of the panel member of the comparative example 1, the frequency of the primary mode of the panel member of the example was even greater than the frequency of the panel member of the comparative example 1 by approximately 18%. According to this result, by performing the spot welding on the working scheduled portion beforehand, the vibration characteristic of the panel member in the low frequency region is further improved. That is, the superior effects of the present invention were recognized.

As described above, according to the embodiment, since the panel member 10 is constructed by affixing the patch member 15, which is formed of the patch panel 14 and the vibration attenuating resin layer 18, on the main body 12, the vibration attenuating function is performed by the "shear deformation" of the vibration attenuating resin layer 18, whereby generation of vibration and noise due to the vibration are suppressed to a minimum. Moreover, by using the patch member 15, the plate thickness is decreased compared with a case of using a conventional vibration attenuating sheet, whereby a space within a vehicle is greatly enlarged. Furthermore, by using the patch member, the weight is further reduced compared with a case of using a conventional vibration attenuating sheet.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

INDUSTRIAL APPLICABILITY

By using the panel member of the present invention, a transportation vehicle part, in which the vibration characteristic is improved while the thickness and the weight are not greatly increased, is produced. Accordingly, the present invention is suitably used for transportation vehicle parts.

REFERENCE SIGNS LIST 10, 40 panel member
10a, 40a working scheduled portion
12, 44, 50, 58 main body
14, 46, 52, 60 patch panel
15 patch member
18 vibration attenuating resin layer
20 dash panel
22, 42a, 48a, 48b bead portion
28a, 28b, 56a, 56b bent portion
42 shock absorber tower
48 trunk floor panel
56 floor tunnel part

The invention claimed is:

1. A transportation vehicle part comprising:
   a patch member constructed of
      a plate-like metal patch panel, and
      a vibration attenuating resin layer provided along a surface of the patch panel; and
   a metal base plate closely adhered with the vibration attenuating resin layer of the patch member and affixed with the patch member,
   wherein the patch panel and the base plate include a ridged portion, and the patch panel and the base plate are welded together at at least one part of a bent portion of the ridged portion, and
   wherein a reinforcing member is provided on the surface of the base plate opposite to the surface on which the patch member is provided and the reinforcing member is provided at a position that faces the patch member.

2. A panel member comprising:
   a patch member constructed of
      a plate-like metal patch panel, and
      a vibration attenuating resin layer provided along a surface of the patch panel; and
   a metal base plate closely adhered with the vibration attenuating resin layer of the patch member and affixed with the patch member,
   wherein the patch panel and the base plate include a ridged portion, and the patch panel and the base plate are welded together at least one part of a bent portion of the ridged portion.

3. The panel member according to claim 2,
   wherein the transportation vehicle part is provided with a rigidity reinforced portion which has an uneven shape.

4. The panel member according to claim 2,
   wherein the vibration attenuating resin layer is an electrically conductive.

5. The panel member part according to claim 2,
   wherein the patch panel has a thickness of not less than 0.3 mm and not greater than a thickness of the base plate.

6. The panel member according to claim 2,
   wherein the vibration attenuating resin layer has a thickness of not less than 10 µm and not greater than 1000 µm.

7. The panel member according to claim 2,
   wherein the vibration attenuating resin layer is constructed of multiple layers which have different temperature characteristics with each other.

8. The panel member according to claim 7,
   wherein a panel is inserted between the multiple layers.

9. The panel member according to claim 2,
   wherein an uneven surface processing is performed on a surface of the patch panel or a surface of the base plate, which contacts the vibration attenuating resin layer.

* * * * *